United States Patent Office 3,239,448
Patented Mar. 8, 1966

3,239,448
HYDROCRACKING PROCESS WITH THE USE OF A CATALYST COMPOSITE, COMPRISING A GROUP IB AND A PALLADIUM GROUP METAL
William B. Wilson, Pleasant Hill, Calif., assignor to Shell Oil Company, New York, N.Y., a corporation of Delaware
No Drawing. Filed Apr. 30, 1962, Ser. No. 191,291
16 Claims. (Cl. 208—111)

This invention relates to a process for the catalytic conversion of hydrocarbons and an improved catalyst therefor. In particular the invention is related to the hydrocracking of hydrocarbons with a catalyst comprising a metal of Group IB of the Periodic Table of Elements and especially such catalysts promoted by a metal of the palladium group.

Destructive hydrogenation, more commonly called hydrocracking, by catalytic means is a well known process which has been practiced commercially in Europe before and during World War II. Destructive hydrogenation of hydrocarbon oil, usually a coal tar or a high-boiling petroleum fraction, such as gas oils or cycle stocks, generally is carried out at quite high temperatures and pressures on the order of 850° F. and 1500 p.s.i.g. and up. In addition, the hydrocracking process is usually carried out in two or more stages, the first stage being a hydrogenation stage to remove deleterious impurities in the feed, and the second stage being the actual hydrocracking stage. Hydrogenation in the first stage usually is sufficiently severe to assure almost complete removal of nitrogen compounds, i.e., to below about 10 parts per million, and preferably 5 parts per million. Nitrogen compounds are considered to be a poison for most, if not all, hydrocracking catalysts.

More recently, the hydrocracking process has received favorable attention in America. While hydrocracking has inherent advantages over conventional catalytic cracking, such as a lower gas and coke make, it is generally considered as a complementary process to conventional catalytic cracking because gas oils and cycle stocks from the catalytic cracking process are excellent hydrocracking feeds. Activity has generally been centered in the development of highly active and stable catalysts for the conversion process. Early catalysts for the hydrocracking process comprised a hydrogenation component on an activated clay, such as tungsten disulfide on HF activated Terrana clay, or iron on HF activated montmorillonite. After the war, improved catalysts such as molybdenum or nickel on silica-alumina were developed. More recently hydrocracking processes have been described which employ nickel sulfide or cobalt sulfide on silica-alumina or platinum or palladium group metal deposited on an acidic refractory oxide support such as silica-alumina.

A hydrocracking process has now been found which employs a catalyst comprising a Group IB metal associated with an acid-acting inorganic refractory oxide. While it is known that Group IB metals have catalytic properties, notably for chemical manufacture, e.g. silver is well known for oxidizing ethylene to ethylene oxide, they are remarkably weak hydrogenation catalysts by themselves, and therefore have been up to now of little, if any, interest for hydrocracking. It has been found that metals of Group IB, when associated with an acid-acting inorganic refractory oxide support such as silica-alumina and promoted with a moderate amount of a palladium group metal, exhibit strong catalytic activity for hydrocracking hydrocarbon oils.

The amount of Group IB metal incorporated in the catalyst, expressed as a percent of the total weight of the catalyst, can vary from about 0.1% to 20%, and preferably about 1% to 10%. The palladium group metal is present in minor promoting amounts, e.g. from about 0.01% to 2% by weight and preferably 0.05% to 1% by weight. The amount of metal in the catalyst is calculated on the basis of elemental metal.

The catalysts are not necessarily equivalent in activity and stability. Of the Group IB metals, gold is considerably less active than silver or copper, which are preferred. Of the palladium group metals, rhodium and ruthenium exhibit good promoting characteristics and are preferred. Highly active and stable catalysts which are particularly preferred are silver promoted with rhodium or ruthenium, especially rhodium, and copper promoted with rhodium or ruthenium, especially ruthenium.

The Group IB and palladium group metals are associated with an acid-acting siliceous inorganic refractory oxide having the ability to catalyze the splitting of carbon to carbon bonds, such as, for example, silica-magnesia, silica-alumina, silica-alumina-boria and the like. The preferred support is predominantly silica and contains from about 50% to about 90% silica with the remainder, i.e. about 50% to 10%, alumina. A particularly preferred silica-alumina catalyst base comprises from about 70% to 90% silica and from about 30% to 10% alumina.

It is generally advantageous to incorporate fluorine into the catalyst, the amount of fluorine varying from about 0.1% to about 5% by weight, and preferably from about 1% to about 3% by weight based on the total weight of the catalyst. In general, a larger amount of fluorine is incorporated into the catalyst as the alumina content of the support is increased.

The catalysts can be prepared by several different methods, although the resulting catalysts are not necessarily equivalent. Activity and stability of the catalyst may vary somewhat according to the particular method of preparation, in addition to the particular metals used. A common and well-known method of preparing a catalyst is to contact the base, e.g. silica-alumina, preferably in the form of pellets or extrudates, with a solution of a soluble metal compound such as a metal salt, e.g. silver nitrate, rhodium nitrate and the like. The impregnation can be carried out first with one metal and then the other metal, or in a single step with one solution containing both metals. If carried out in one impregnation step with a solution of the two metals the particular metal compounds used should, of course, be compatible with one another. After impregnation the catalyst is dried and calcined.

Another method is to incorporate one or more of the metals into the base as the base is formed. For example, a metal compound, such as silver nitrate or rhodium nitrate, or both, can be incorporated into a silica-alumina hydrogel as the hydrogel is formed. This is effected by rapidly mixing a solution of sodium silicate, sodium aluminate, silver nitrate and/or rhodium nitrate, and neutralizing the mixture. One difficulty associated with the preparation of a silver catalyst by this method is that in washing the hydrogel with, for example, ammonium nitrate solution and water to remove sodium ions, a considerable portion of silver is removed as well.

Another method of preparing a catalyst is to contact a silica-alumina hydrogel, preferably after having been washed with ammonium nitrate solution and water to remove sodium ions, with a solution of a metal compound, such as silver nitrate, copper nitrate or other soluble metal salts, wherein the metal is in the form of cations. Metal ions are thereby ion-exchanged into the hydrogel. The palladium group metals can be similarly ion-exchanged into the hydrogel.

Combinations of the above methods can also be used. For example, rhodium can be coprecipitated with a silica-alumina hydrogel, and silver can be added by ion-exchange into the hydrogel. Alternately silica-alumina hydrogel can be formed, silver added by ion-exchange and the rhodium added by impregnation on the ion-exchanged silver catalyst. In general it is desired to ion-exchange at least the Group IB metal, e.g. silver or copper, into a silica-alumina hydrogel, the hydrogel preferably being substantially free from sodium ions. It is also preferred that the hydrogel be treated with ammonium hydroxide prior to the ion-exchange, as catalysts of quite high activity and stability are obtained thereby. Compared with the coprecipitation method, less silver is lost in the preparation of ion-exchanged catalysts.

For a catalyst containing fluorine, it is generally desirable to incorporate the fluorine into the silica-alumina hydrogel. This is conveniently accomplished by the addition of sodium fluoride to the sodium aluminate solution which is mixed with sodium silicate solution to form a coprecipitated silica-alumina hydrogel.

In the hydrocracking process, feed is introduced to the reaction zone as a liquid, vapor or mixed liquid vapor phase, depending on the temperature, pressure and amount of hydrogen mixed with the feed and the boiling range of the feed stock utilized. The hydrocarbon feed, including fresh as well as recycled feed, is introduced into the reaction zone with a large excess of hydrogen since the hydrocracking process is accompanied by rather high consumption of hydrogen, usually on the order of 500 to 2000 standard cubic feet of hydrogen per barrel of total feed converted. Conversion herein refers to the products obtained which fall below 420° F. Excess hydrogen is recovered at least in part from the reaction zone effluent and recycled to the reactor, together with additional makeup hydrogen. Pure hydrogen is not necessary, as any suitable hydrogen-containing gas which is predominantly hydrogen can be used. Particularly suitable is a hydrogen-rich gas containing on the order of 70% to 90% hydrogen, which is obtained from a catalytic reforming process.

Hydrocracking feed is a hydrocarbon distillate, preferably boiling above the boiling range of gasoline, for example boiling in the range of about 350° to 950° F., and preferably in the range of about 550° to 800° F. It is generally desirable to subject the hydrocarbon feed to a suitable pretreatment such as a catalytic hydrogenation treatment with a hydrogenation catalyst, e.g. cobalt or nickel and molybdenum on alumina. An advantage of such a hydrogenation treatment is to remove from the feed coke-forming constituents which tend to deposit on the hydrocracking catalyst and to remove impurities such as nitrogen compounds which act as a hydrocracking suppressor.

The effect of nitrogen compounds on a hydrocracking catalyst performance depends to a certain extent upon the type of the nitrogen compound and thus, in a practical sense, upon the nature of the feed. For example, in a homologous series such as pyridine, quinoline and acridine, the rate of decrease of activity is related to the basicity and vapor pressure of the compound. On the other hand, even certain relatively non-basic compounds such as benzonitrile can be a strong poison. In general, therefore, the nitrogen content of a light feed such as light gas oil may be higher than that of a heavy feed such as a heavy gas oil. Moreover, the nitrogen content of a straight-run gas oil may be somewhat higher than that of a similar boiling catalytically cracked gas oil, since a portion of the nitrogen compounds in straight-run gas oil seems to be innocuous or easily converted to less deleterious forms. Thus, while some feeds of quite high nitrogen content may be hydrocracked, better results are obtained if the total nitrogen content of the feed is reduced to below about 30 p.p.m. w. and preferably below 10 p.p.m. w.

Operating conditions employed in the hydrocracking conversion include a temperature in the range of about 500° to about 850° F., a hydrogen to oil mole ratio of about 5 to 50, a pressure of about 500 to 3000 p.s.i.g. and a liquid hourly space velocity of about 0.1 to about 10, preferably 0.5 to 5. Under normal conditions, total pressure employed in the hydrocracking zone will be in the range of from about 1000 to 2000 p.s.i.g. For a given partial pressure of hydrogen in the reaction zone, total pressure will depend on such factors as purity of the hydrogen gas, hydrogen/oil ratio and the like. Too low a partial pressure of hydrogen tends to decrease catalyst life, while too high a partial pressure tends to saturate aromatics, which results in excessive hydrogen consumption and loss of octane quality of the gasoline product.

The invention is illustrated in more detail in the following examples.

EXAMPLE I

A series of catalysts comprising a metal of Group IB or a metal of the palladium group and silica-alumina was prepared and tested in a bench scale hydrocracking unit. The catalysts were prepared by impregnating a solution of the metal salt (chlorine or nitrate) on pilled silica-alumina (approx. 15% w. $Al_2O_3$) cracking catalyst treated with 1% Dow Corning silicone oil. The impregnated catalyst was calcined in air at 1020° F. for about two hours.

Each catalyst was employed as a fixed bed to hydrocrack hydrogenated catalytically cracked gas oil boiling in the range from about 450° to 800° F. and having a total nitrogen content of 2 p.p.m. w. Operating conditions were 4 LHSV, 644° F. (340° C.), 1500 p.s.i.g. and 10/1 hydrogen/oil mole ratio. Activity and stability were determined for each catalyst. Activity index corresponds to conversion to material boiling below 420° F. at 3 hours time, whereas stability is the percent retention of activity after a decade of running, e.g. indicated activity at 10 hours as a percent of activity at 1 hour. Results are given in Table 1.

Table 1

|  | 1 | 2 | 3 | 4 | 5 | 6 |
|---|---|---|---|---|---|---|
| Ag, percent w | 4.1 | | | | | |
| Cu, percent w | | 5 | | | | |
| Au, percent w | | | 1 | | | |
| Ru, percent w | | | | 2.0 | | |
| Rh, percent w | | | | | 0.5 | |
| Pd, percent w | | | | | | 0.6 |
| Activity | 43 | 40 | 10 | 34 | 64 | 66 |
| Stability | 75 | 75 | 75 | 80 | 90 | 66 |
| Test Duration, Vol. oil/vol. cat | 26 | 12 | 22 | 16 | 16 | 20 |

EXAMPLE II

A second series of catalysts was prepared wherein the metal component was incorporated into silica-alumina hydrogel by cogellation or by ion-exchange. Of the Group IB metals, only silver was used in this series.

To prepare a silica-alumina hydrogel, a solution of sodium silicate was rapidly mixed with a solution of sodium aluminate and sodium fluoride, and the mixture was neutralized by the addition of dilute sulfuric acid. The proportions of sodium aluminate and sodium fluoride were such as to provide approximately 25% w. alumina and 1.5% fluorine in the hydrogel base. For catalyst 8, the sodium fluoride was omitted. The hydrogel was washed with ammonium nitrate solution and water to remove sodium ions. In general the sodium content was reduced to 0.1% w. or less, although some catalysts contained as high as 0.3% w. sodium.

Catalysts 7 and 8 were prepared by co-gelling the metal with the silica-alumina. This was accomplished by the addition of metal salt solution to the sodium silicate and sodium aluminate solution. For catalysts 9 through 12, washed silica-alumina hydrogel was slurried in a solution of the metal salt to ion-exchange metal ions for ammonium ions in the hydrogel. For a bi-metallic catalyst, a single solution containing a salt of both metals was used. The ion-exchanged hydrogel was washed with water to remove excess solution. The washed hydrogel was dried and calcined at 1020° F. Each catalyst was tested at the same conditions and with a feed similar to that described above in Example I. Results are given in Table 2.

Table 2

|  | 7 | 8 | 9 | 10 | 11 | 12 |
|---|---|---|---|---|---|---|
| Ag, percent w | 2.0 | 1.1 | 3.8 | 4.1 | 4.8 | 3.9 |
| Ru, percent w |  |  | 1.5 |  |  |  |
| Rh, percent w |  | 0.3 |  |  |  | 0.2 |
| Pd, percent w |  |  |  |  | 1.7 |  |
| Activity | 25 | 55 | 70 | 60 | 78 | 100 |
| Stability | 75 | 85 | 70 | 75 | 30 | 85 |
| Test Duration, Vol. oil/vol. cat | 12 | 26 | 24 | 26 | 18 | 28 |

EXAMPLE III

A series of extruded catalysts comprising copper and a palladium group metal with silica-alumina was prepared and tested. The catalysts were prepared by ion-exchanging metal ions with a fluorine-containing silica-alumina hydrogel in the manner described above in Example II. The catalysts were calcined in hydrogen, except for catalyst 14, which was calcined in air, and tested in a bench scale hydrocracking unit at the same conditions and with a feed similar to that described in Example I. Results are given in Table 3.

Table 3

|  | 13 | 14 | 15 | 16 |
|---|---|---|---|---|
| Cu, percent w | 5.1 | 5.3 | 5.2 | 5 |
| Ru, percent w | 1.5 | 0.5 |  |  |
| Rh, percent w |  |  | 0.26 |  |
| Pd, percent w |  |  |  | 1.1 |
| Activity | 45 | 50 | 65 | 45 |
| Stability | 80 | 75 | 65 | 60 |
| Test Duration, Vol. oil/vol. cat | 180 | 184 | 120 | 68 |

EXAMPLE IV

Catalyst No. 8 of Example II was tested in a bench scale hydrocracking unit for an extended period of time with the hydrogenated catalytically cracked gas oil which was used in Example I. The operation was conducted at a liquid hourly space velocity of 1, a pressure of 1500 p.s.i.g. and hydrogen/oil mole ratio of 10/1. Temperature was adjusted as necessary to maintain conversion at about 60% w. Excellent stability of the catalyst is indicated by the slight increase in temperature demand during the test, the required temperature increasing from about 600° F. at 20 hours to 617° F. at about 300 hours when the test was terminated.

A similar test was made with a catalyst comprising 11% w. silver and 0.15% w. ruthenium with silica-alumina. The metals were ion-exchanged into a washed silica-alumina hydrogel (28% $Al_2O_3$, 1.5% F.). Hydrocracking was carried out at the same conditions but with another hydrogenated catalytically cracked gas oil (2 p.p.m. w. N). This catalyst also demonstrated excellent stability, the temperature being 590° F. at the end of 50 hours and increasing at the rate of 27° F./decade of time (determined from a graph of temperature against logarithm of time, in hours).

EXAMPLE V

Additional tests of extended duration were conducted with promoted copper and silver catalysts. The catalysts were prepared by ion-exchanging the metal into a washed silica-alumina hydrogel (28% $Al_2O_3$, 1.5% F.). After washing the ion-exchanged hydrogel, the hydrogel was extruded, dried in air at about 250° F. and calcined in hydrogen at 1000° F. Catalyst 17 contained 4% w. silver and 0.08% w. rhodium. Catalyst 18 contained 5% w. copper and 0.5% w. ruthenium. Each catalyst was tested in the hydrocracking of a hydrogenated catalytically cracked gas oil (2 p.p.m. w. N) at 1500 p.s.i.g. and 30/1 $H_2$/oil ratio.

With the silver catalyst, liquid hourly space velocities of 4, 2 and 1 were used during the test. Conversion, initially 40% w. at 4 LHSV and 644° F., was increased after a few hours to about 60% and maintained at about this level by adjusting temperature periodically. Stability of the catalyst was quite good, a temperature of only 660° F. being required to maintain conversion at 1 LHSV when the test was terminated after a total operating time of 600 vol. oil/vol. cat.

The test with the copper catalyst was conducted at 1 LHSV throughout the entire operating period. The $H_2$/oil ratio, initially 30/1, was lowered to 5/1 after 470 hours operation. Excellent stability is indicated by a temperature demand of only 626° F. after 550 vol. oil/vol. cat. when the test was terminated, with a decline rate of only about 22° F./decade of time (determined from a graph of temperature against logarithm of time, in hours).

Isoparaffin to normal paraffin ratios of the light hydrocarbons in the product were good, as may be seen from Table 4 below.

Table 4

|  | Ag-Rh | Cu-Ru |
|---|---|---|
| Conditions: |  |  |
| Period, hours | 77-78 | 504-509 |
| Temperature, ° F | 662 | 631 |
| $H_2$/oil mole ratio | 30 | 5 |
| LHSV | 2 | 1 |
| Results: |  |  |
| Conversion, percent w. <420° F | 69 | 69 |
| $H_2$ consumption, s.c.f./bbl | 880 | 750 |
| Yields, percent w.: |  |  |
| Gas <$C_4$ | 2.5 | 1.0 |
| $C_4$ | 7.2 | 4.7 |
| $C_5$ | 5.5 | 5.0 |
| $C_6$ | 4.2 | 4.3 |
| Ratio i/n: |  |  |
| $C_4$ | 2 | 3 |
| $C_5$ | 13 | 16 |
| $C_6$ | 17 | 20 |

EXAMPLE VI

The effect of nitrogen compounds is demonstrated in the following experiments with silver-rhodium catalysts. A catalyst was prepared by co-gelling rhodium nitrate with sodium silicate, sodium aluminate and sodium fluoride. The proportions of sodium aluminate and sodium fluoride were such as to give approximately 28% w. alumina and 1.5% fluorine in the base. After washing the hydrogel with ammonium nitrate and water to remove sodium ions, the hydrogel was slurried in silver nitrate solution to ion-exchange silver ions into the hydrogel. The hydrogel was then washed, dried, and calcined. The finished catalyst contained 5.1% w. silver and 0.5% rhodium. This catalyst and catalyst No. 12 in Example II were tested in the bench scale hydrocracking unit, at the test conditions described in Example I, with a hydrogenated catalytically cracked gas oil containing 23 p.p.m. w. N. Activity and stability index are given in Table 5.

Table 5

| Ag, percent w | 5.1 | 3.9 |
|---|---|---|
| Rh, percent w | 0.5 | 0.2 |
| Activity | 63 | 65 |
| Stability | 65 | 55 |

A comparison of the results for catalyst 12 with a low nitrogen feed in Table II shows both activity and stability are reduced at the higher level of nitrogen compounds.

I claim as my invention:

1. A method of hydrocracking a heavy hydrocarbon oil which comprises contacting said oil in the presence of hydrogen under hydrocracking conditions with a catalyst comprising from about 0.1% to 20% by weight of a metal of Group IB and about 0.01% to 2% by weight of a metal of the palladium group intimately associated with an acid-acting siliceous refractory oxide, said catalyst having been prepared by incorporating at least the Group IB metal into a hydrogel of the refractory oxide.

2. A method of hydrocracking a heavy hydrocarbon oil which comprises contacting said oil in the presence of hydrogen under hydrocracking conditions with a catalyst comprising from about 0.1% to 20% by weight of a metal of Group IB and about 0.05% to 1% by weight of a metal of the palladium group intimately associated with silica-alumina, said catalyst having been prepared by incorporating at least the Group IB metal into silica-alumina hydrogel.

3. A method of hydrocracking a heavy hydrocarbon oil which comprises contacting said oil with a catalyst comprising from about 0.1% to 20% by weight silver and 0.01% to 2% by weight rhodium intimately associated with an acid-acting siliceous refractory oxide support at a temperature in the range from about 500° to 850° F., a pressure in the range from 500 to 3000 p.s.i.g., a liquid hourly space velocity of 0.1 to 10 and a hydrogen to oil mole ratio in the range from about 5 to 50, said catalyst having been prepared by incorporating at least the silver into a hydrogel of the refractory oxide.

4. A method of hydrocracking a heavy hydrocarbon oil which comprises contacting said oil with a catalyst comprising from about 0.1% to 20% by weight silver and 0.01% to 2% by weight rhodium intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst having been prepared by incorporating at least the silver into silica-alumina hydrogel.

5. The method according to claim 4 wherein the hydrocarbon is a gas oil boiling in the range from about 350° to 950° F. and having a nitrogen content of less than 30 parts per million by weight.

6. A method of hydrocracking a heavy hydrocarbon oil which comprises contacting said oil with a catalyst comprising from about 0.1% to 20% by weight silver and 0.01% to 2% by weight ruthenium intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst having been prepared by incorporating at least the silver into silica-alumina hydrogel.

7. The method according to claim 6 wherein the hydrocarbon is a gas oil boiling in the range from about 350° to 950° F. and having a nitrogen content of less than 30 parts per million by weight.

8. A method of hydrocracking a heavy hydrocarbon oil which comprises contacting said oil with a catalyst comprising from about 0.1% to 20% by weight copper and 0.01% to 2% by weight rhodium intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst having been prepared by incorporating at least the copper into silica-alumina hydrogel.

9. The method according to claim 8 wherein the hydrocarbon is a gas oil boiling in the range from about 350° to 950° F. and having a nitrogen content of less than 30 parts per million by weight.

10. A method of hydrocracking a heavy hydrocarbon oil which comprises contacting said oil with a catalyst comprising from about 0.1% to 20% by weight copper and 0.01% to 2% by weight ruthenium intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst having been prepared by incorporating at least the copper into silica-alumina hydrogel.

11. The method according to claim 10 wherein the hydrocarbon is a gas oil boiling in the range from about 350° to 950° F. and having a nitrogen content of less than 30 parts per million by weight.

12. A catalyst suitable for hydrocracking hydrocarbon oils which comprises from about 0.1% to 20% by weight of a first metal selected from the group consisting of copper and silver and about 0.01% to 2% by weight of a second metal selected from the group consisting of rhodium and ruthenium initimately associated with an acid-acting siliceous refractory oxide prepared by incorporating at least the first metal into a hydrogel of the refractory oxide.

13. A catalyst suitable for hydrocracking hydrocarbon oils which comprises from about 0.1% to 20% by weight of a first metal selected from the group consisting of copper and silver and about 0.01% to 2% by weight of a second metal selected from the group consisting of rhodium and ruthenium intimately associated with silica-alumina prepared by incorporating at least the first metal into a silica-alumina hydrogel.

14. The catalyst according to claim 13 wherein at least the first metal is incorporated into the catalyst by contacting a silica-alumina hydrogel substantially free from sodium ions with an aqueous solution of a compound of said metal wherein the metal is present as a cation.

15. A catalyst suitable for hydrocracking oils which comprises from about 0.1% to 20% by weight copper and about 0.01% to 2% by weight ruthenium intimately associated with silica-alumina, said catalyst having been prepared by incorporating at least the copper into a hydrogel of silica-alumina.

16. A catalyst suitable for hydrocracking oils which comprises from about 0.1% to 20% by weight silver and about 0.01% to 2% by weight ruthenium intimately associated with silica-alumina, said catalyst having been prepared by incorporating at least the silver into a hydrogel of silica-alumina.

References Cited by the Examiner

UNITED STATES PATENTS

| | | | |
|---|---|---|---|
| 2,268,110 | 12/1941 | Connolly | 208—120 |
| 2,897,135 | 7/1959 | Doumani | 208—112 |
| 2,926,130 | 2/1960 | Hogan | 208—110 |
| 2,961,414 | 11/1960 | Burton et al. | 252—455 |
| 3,073,777 | 1/1963 | Oettinger et al. | 208—112 |

PAUL M. COUGHLAN, *Primary Examiner.*

ALPHONSO D. SULLIVAN, DELBERT E. GANTZ, *Examiners.*